United States Patent [19]

Beyer et al.

[11] Patent Number: 5,354,578
[45] Date of Patent: Oct. 11, 1994

[54] PROCESS FOR THE PREPARATION OF WEAR-RESISTANT HARD MATERIAL LAYERS ON METALLIC SUPPORTS

[75] Inventors: Hans-Hermann Beyer, Kahl; Roland Gerner, Rodenbach; Wolfgang Weber, Karlstein; Klaus Zimmermann, Alzenau, all of Fed. Rep. of Germany

[73] Assignee: Degussa Aktiengesellschaft, Frankfurt, Fed. Rep. of Germany

[21] Appl. No.: 92,947

[22] Filed: Jul. 19, 1993

Related U.S. Application Data

[63] Continuation of Ser. No. 897,662, Jun. 12, 1992, abandoned.

[30] Foreign Application Priority Data

Jun. 13, 1991 [DE] Fed. Rep. of Germany ....... 4119462
Sep. 25, 1991 [DE] Fed. Rep. of Germany ....... 4131871

[51] Int. Cl.$^5$ .............................................. B05D 3/02
[52] U.S. Cl. .................................... 427/190; 427/201; 427/226; 427/376.1

[58] Field of Search ............ 427/190, 226, 201, 376.1; 228/248

[56] References Cited

U.S. PATENT DOCUMENTS 3,475,161 10/1969 Ramirez ............................... 427/190
5,098,748 3/1992 Shimizu et al. ..................... 427/190

*Primary Examiner*—Shrive Beck
*Assistant Examiner*—David M. Maiorana
*Attorney, Agent, or Firm*—Beveridge, DeGrandi, Weilacher & Young

[57] ABSTRACT

Wear-resistant hard material layers are prepared on a metal support by applying onto said support a mixture of hard material particles, solder particles and organic binding agents and thereafter soldering the layer by heating. The mixture thus obtained can be applied by means of immersing, screen printing, brushing, spraying or spreading. The stable suspension required for the above steps is prepared by homogeneously grinding the particles together to a particle size from 1 to 20 μm and adding an organic solvent to the binding agent.

19 Claims, No Drawings

...(long)

PROCESS FOR THE PREPARATION OF WEAR-RESISTANT HARD MATERIAL LAYERS ON METALLIC SUPPORTS

This application is a continuation of application Ser. No. 07/897,662, filed Jun. 12, 1992, now abandoned, which application is entirely incorporated herein by reference.

BACKGROUND AND INTRODUCTION

The present invention relates to the preparation of wear-resistant hard material layers on a metallic support by applying onto said metallic support a mixture of a hard material, a soldering powder and an organic binding agent (which is thermally decomposable without leaving a residue); burning out said binding agent at a temperature between 300° C. and 500° C. and soldering the particles of said hard material on said support at a temperature between 800° C. and 1100° C.

Currently several techniques are used to protect work pieces from wear, particularly from abrasion. In addition to conventional heat treatment methods (e.g. case hardening, nitration, and boronation), other processes such as thermal spraying and welding and CVD- and PVD-techniques are also used.

According to the process disclosed in DE-OS 31 48 362, wear-resistant layers and solder layers are prepared by spraying a corresponding mixture of metallic powder and wax with the aid of compressed air and subsequently sintering. This process is relatively expensive and is unsuitable for the formation of parts having complicated geometry.

In U.S. Pat. No. 4,749,594, a process for applying hard materials on surfaces is disclosed wherein at first a solder layer and an organic binder and thereafter the hard materials are applied and heated.

According to the process disclosed in U.S. Pat. No. 3,475,161, the object is coated by immersing it into a mixture of the hard material particles, an organic binder and a solvent, and subsequently subjecting the system to sintering. However, this process fails to provide protective layers with optimal effect and good adhesion.

Recently another process has become known, namely the so-called brazecoat technique. According to this process, hard material-solder layers are applied onto the parts subject to wear by placing or sticking on the area to be protected a hard material-solder connecting mat and subjecting this part to a soldering process under a protective gas. The thickness of the layer thus obtained falls generally in the range between 500 and 1500 μm. Such a process is disclosed e.g. in DE-PS 3,801,958.

Pursuant to the above process, formed bodies made of hard materials, soldering powder and organic plastic materials (which can be thermally decomposed without leaving any residue), are applied onto the area to be protected and soldered at a temperature of about 1100° C., whereby the plastic material serving as binding agent is decomposed and forms a hard material layer in a solder matrix on the sites to be protected.

The above mat process has several drawbacks, for example, wear layers below about 500 μm can not be applied by this method. A further disadvantage resides in the fact that the process is limited to parts of simple geometries because complicated mat configurations are difficult to prepare and their application can not be carried out in an automatic manner.

SUMMARY OF THE INVENTION

One object of the present invention is to provide a process for the preparation of wear-resistant hard material layers on a metallic support by applying onto said support a mixture of a hard material, a soldering powder and an organic bonding material, which is thermally decomposable without leaving a residue, then burning out said binding agent at a temperature between 300° and 500° C., and thereafter soldering said hard material particles on said support at a temperature between 800° and 1100° C. The process of the present invention is suitable for the preparation of layers having a thickness significantly below 500 μm. In addition, complicated molded parts can also be prepared, and the manufacturing process can be readily automated.

DETAILED DESCRIPTION OF THE INVENTION

According to the present invention, this and other objects are achieved by grinding said hard material particles together with said soldering particles to form a homogenous mixture having an average particle size of 20 μm or below;

transforming said homogenous mixture into a suspension by admixture with 0.1 to 20% by weight of said organic binding agent and with 1 to 50% by weight of an organic solvent and the balance being the hard material/soldering particles;

and applying said suspension onto said support in the form of a layer which has a thickness between 10 and 500 μm by means of immersing, screen printing, brushing, spraying or spreading.

As binding agents, preferably polyacrylates, polybutene, polystyrene or cellulose derivatives can be used. Other vaporizable organic materials well known in the art can also be used provided they do not interfere with the overall process.

As solvent, preferably hydrocarbons, glycol ethers, glycol esters, alcohols and ketones, having an evaporation number between 10 and 10,000 can be applied. Persons skilled in the art will be readily able to select such the solvent.

Further in accordance with the application onto the support, it might be preferable to adjust the viscosity of the suspension by adding a theological substance. Such materials are also known in the art.

In order to perform the process of the present invention with the desired result, it is decisively important to achieve a homogenous distribution of the hard material and solder particles which can be carried out by a careful and simultaneous grinding to an average particle size of 20 μm or below. If the particle size is above 20 μm, the stability of the suspension is unsatisfactory because the particles deposit in a different manner. At a particle size below about 1 μm, the grinding procedure becomes too lengthy. Thus the broad range of average particle size is 1 to 20 μm. A particle size between 1 and 10 μm proved to be the most preferable. The particles can be preferably ground by using a ball mill or an attritor.

The soldering powder, preferably a nickel or copper based hard solder, having an average particle size of 5–20 μm and the hard material (e.g. WC, $Cr_3C_2$, TiC, average particle size 5–30 μm) are introduced together into a ball mill (WC-balls, diameter 1–2 mm) equipped with a stirrer (attritor) and ground in isopropanol for a period of time between 30 minutes and 2 hours. The ratio of the solder powder amounts to 10–45% by weight, depending on the hard material/solder powder system used (e.g. in a system of nickel based solder/tungsten carbide the ratio of the solder is 25-40% by weight). The fine powder mixture having an average particle size of 1-20 μm after the grinding procedure is finally processed to a hard material-solder suspension by admixing with a binding agent (0.1-20% by weight) made e.g. from polyisobutylene or polyacrylate and a solvent (1-50% by weight; e.g. xylene). The viscosity of the suspension thus obtained can be adjusted to the corresponding value, depending on the desired processing method, by adding a known theological substance so that the suspension can be applied onto the parts to be coated by means of immersing, screen printing, brushing, spraying or spreading. With the aid of the immersing process a layer thickness ranging from 10 to 500 μm can be achieved. The treatment can also be carried out repeatedly several times. According to the screen printing process the thickness of the layer depends on the dimensions of the screen applied. Before the actual soldering step (800°-1100° C.; inert gas atmosphere or in vacuo), the binding agent is burned out in a previous step at a temperature of about 300°-500° C.

A wide variety of solder particles and hard particles are known in the industry for present purposes and such materials can be used for carrying out the invention herein.

Further details of the present invention are to be found in the following examples. It is however by no means intended to limit the scope of the patent to the examples which merely serve to illustrate the invention.

EXAMPLE 1

1000 g of tungsten carbide powder (average particle size 15 μm) and 350 g of nickel based solder ($Ni_3P$, average particle size 10 μm) were ground in a ball mill provided with a stirrer (stir beaker made from polyethylene; useful volume 3 liters, the stirrer is made of stainless steel with hard metal eccentric plates; velocity 700 rpm) by using hard metal balls having a diameter of 2 mm, in isopropanol for 2 hours. After the grinding step the isopropanol was distilled off and to the powder mixture thus obtained a mixture of 20 g of polyisobutylene and 91 g of light petrol was added. The mixture was stirred mechanically for an hour whereby a suspension was obtained which can be processed by screen printing and is stable for a longer period of time.

EXAMPLE 2

The pre-treatment of the powder mixture comprising hard metal powder and soldering powder was carried out in a manner analogous to Example 1. The isopropanol was distilled off, whereupon to 1000 g of this powder mixture a mixture of 16.5 g of polyisobutylene, 266 g of light petrol and 4 g of Thixatrol ST (as theological agent) was added. The mixture was stirred for a period of about an hour. A suspension was formed which can be applied also onto complex soldered parts by immersion in the form of a solderable layer having a thickness of about 65 μm.

EXAMPLE 3

1000 g of tungsten carbide powder (average particle size 25 μm) and 300 g of copper based soldering powder (86% by weight Cu, 12% by weight Mn, 2% by weight Ni; average particle size 10 μm) were processed in accordance with Example 1 by using the ball mill and conditions described therein. Isopropanol was distilled off whereupon to the powder mixture thus obtained (1000g) a mixture of 117 g of polyacrylate, 118 g of xylene and 4 g of Thixatrol ST was added. The mixture was intensively stirred for an hour under slight warming (50° C). The suspension thus obtained is suitable for screen printing and can be stored for a longer period of time.

EXAMPLE 4

1000 g of chrome carbide (average particle size 25 μm) and 450 g of nickel based solder (82.4% by weight Ni, 7% by weight Cr, 3% by weight Fe, 4.5% by weight Si, and 3.1% by weight B; average particle size 10 μm) were ground with hard metal balls (diameter 1 mm) at a velocity of 700 rpm in isopropanol in the ball mill equipped with a stirrer as described in Example 1. The isopropanol was distilled off. To 1000 g of the powder mixture thus obtained, 13 g of polyisobutylene, 225 g of light petrol and 6 g of Thixatrol were added. After stirring for about an hour a suspension was obtained which can be worked up by spraying. The thickness of the layer may vary between 30 to 150 μm, depending on the parameters of the spraying step.

The suspension thus obtained can be applied onto the surface to be protected by carrying out automatically the above mentioned coating procedures.

Further variations and modifications of the invention will become apparent to those skilled in the art from the foregoing and are intended to be encompassed by the claims appended hereto.

German Priority Applications P 41 19 462.4 and P 41 31 871.4,, filed on Jun. 13, 1991 and Sep. 25, 1991 respectively, are relied on and incorporated by reference.

What is claimed:

1. A process for the preparation of a wear-resistant material layer on a metallic support comprising:
    (a) grinding hard material particles and soldering particles to a homogeneous mixture having an average particle size from 1 to 20 μm, wherein said soldering particles are selected from the group consisting of $Ni_3P$ and copper based particles;
    (b) transforming said homogenous mixture into a suspension by admixture with 0.1 to 20% by weight of an organic binding agent and from 1 to 50% by weight of an organic solvent and the balance of the mixture being said hard material/soldering particles;
    (c) applying said suspension onto said support in the form of a layer which has a thickness between 10 and 500 μm, wherein said organic binding agent is thermally decomposable without leaving a residue;
    (d) burning out said binding agent at a temperature between 300° C. and 500° C.;
    (e) and soldering said hard material particles on said support by heating at a temperature between 800° C. to 1100° C.

2. The process according to claim 1, wherein said organic binding agent is selected from the group consisting of polyacrylate, polybutene, polystyrene, cellulose derivatives, and mixtures thereof.

3. The process according to claim 1, wherein said organic binding agent is polyisobutylene.

4. The process according to claim 1, wherein said organic solvent is selected from the group consisting of hydrocarbon, glycol ether, glycol ester, alcohol and ketone, said solvent having an evaporation number between 10 and 10,000.

5. The process according to claim 4, wherein said organic solvent is xylene or light petrol.

6. The process according to claim 1, wherein the viscosity of said suspension is adjusted by adding a theological substance.

7. The process according to claim 6 wherein said theological substance is Thixatrol ST.

8. The process according to claim 1, wherein said soldering particles have an average particle size of 5 to 20 μm.

9. The process according to claim 1, wherein said hard material particles are WC, $Cr_3C_2$ or TiC with an average particle size of 5 to 30 μm.

10. The process according to claim 3, wherein in step (a) said average particle size is from 1 to 10 μm.

11. The process according to claim 1, wherein in step (a) the amount of said soldering particles is 10 to 45% by weight.

12. The process according to claim 11, wherein said hard material particles are WC and said soldering particles are present in an amount of 25 to 40% by weight.

13. A process for the preparation of a wear-resistant material layer on a metallic support comprising:
 (a) grinding hard material particles and soldering particles to a homogeneous mixture having an average particle size from 1 to 20 μm, wherein said soldering particles are selected from the group consisting of $Ni_3P$ and copper based particles with an average particle size of 5 to 20 μm and wherein said hard material particles are selected from the group consisting of WC, $Cr_3C_2$ TiC particles with an average particle size of 5 to 30 μm;
 (b) transforming said homogenous mixture into a suspension by admixture with 0.1 to 20% by weight of an organic binding agent and from 1 to 50% by weight of an organic solvent and the balance of the mixture being said hard material/soldering particles;
 (c) applying said suspension onto said support in the form of a layer which has a thickness between 10 and 500 μm, wherein said organic binding agent is thermally decomposable without leaving a residue;
 (d) burning out said binding agent at a temperature between 300° C. and 500° C.;
 (e) and soldering said hard material particles on said support by heating at a temperature between 800° C. to 100° C.

14. A process for the preparation of a wear-resistant material layer on a metallic support comprising:
 (a) applying a suspension onto said metallic support in the form of a layer which has a thickness between 10 and 500 μm, said suspension comprising an admixture of a homogeneous mixture of hard material particles and soldering particles having an average particle size from 1 to 20 μm with 0.1 to 20% by weight of an organic binding agent and from 1 to 50% by weight of an organic solvent and the balance of the mixture being said hard material/soldering particles, wherein said organic binding agent is thermally decomposable without leaving a residue, wherein said soldering particles are selected from the group consisting of $Ni_3P$ and copper based particles;
 (b) burning out said binding agent at a temperature between 300° C. and 500° C.;
 (c) and soldering said hard material particles on said support by heating at a temperature between 800° C. to 1100° C.

15. The process according to claim 14, wherein said organic binding agent is selected from the group consisting of polyacrylate, polybutene, polystyrene, cellulose derivatives, and mixtures thereof.

16. The process according to claim 14, wherein said organic binding agent is polyisobutylene.

17. The process according to claim 14, wherein said organic solvent is selected from the group consisting of hydrocarbon, glycol ether, glycol ester, alcohol and ketone, said solvent having an evaporation number between 10 and 10,000.

18. The process according to claim 14, wherein said soldering particles have an average particle size of 5 to 20 μm.

19. The process according to claim 14, wherein said hard material particles are WC, $Cr_3C_2$ or TiC with an average particle size of 5 to 30 μm.

* * * * *